US012783353B2

(12) United States Patent
Muthiah et al.

(10) Patent No.: US 12,783,353 B2
(45) Date of Patent: Nov. 3, 2026

(54) SOLAR POWER BASED MEMORY REFRESH IN A DATA STORAGE DEVICE

(71) Applicant: Sandisk Technologies, Inc., Milpitas, CA (US)

(72) Inventors: Ramanathan Muthiah, Bangalore (IN); Akhilesh Yadav, Bangalore (IN); Balaji Thraksha Venkataramanan, Bangalore (IN)

(73) Assignee: Sandisk Technologies, Inc., Milpitas, CA (US)

(*) Notice: Subject to any disclaimer, the term of this patent is extended or adjusted under 35 U.S.C. 154(b) by 32 days.

(21) Appl. No.: 18/943,022

(22) Filed: Nov. 11, 2024

(65) Prior Publication Data

US 2026/0133876 A1 May 14, 2026

(51) Int. Cl.
*G06F 11/10* (2006.01)

(52) U.S. Cl.
CPC ...... *G06F 11/1068* (2013.01); *G06F 11/1016* (2013.01)

(58) Field of Classification Search
None
See application file for complete search history.

(56) References Cited

U.S. PATENT DOCUMENTS

| | | | | |
|---|---|---|---|---|
| 7,774,390 | B2 | 8/2010 | Shin | |
| 9,747,158 | B1 * | 8/2017 | Kannan | G11C 16/3495 |
| 10,217,082 | B2 * | 2/2019 | Vasantham | G06Q 10/087 |
| 11,656,990 | B2 | 5/2023 | Jeon | |
| 11,934,662 | B2 | 3/2024 | Zhao | |
| 2013/0205075 | A1 | 8/2013 | Twitto | |
| 2017/0110178 | A1 | 4/2017 | Bains | |

FOREIGN PATENT DOCUMENTS

KR 100899591 B1 5/2009

* cited by examiner

*Primary Examiner* — Guerrier Merant
(74) *Attorney, Agent, or Firm* — Arlene P. Neal; NEAL BLIBO LLC

(57) ABSTRACT

A storage device may maintain data integrity for data stored on a memory device when the storage device is disconnected from a host for a given period of time. The storage device may include a memory device including blocks for storing data and a connection to an external power source that provides power to the storage device when the storage device is disconnected from the host. The storage device may also include a controller to monitor the health of the blocks on the memory device. The controller may determine a power capability of the external power source and the background operations that may be performed based on the power capability of the external power source and the health of the blocks on the memory device. The controller may refresh the data on the memory device based on the power capability of the external power source.

20 Claims, 5 Drawing Sheets

SOLAR POWER BASED MEMORY REFRESH IN A DATA STORAGE DEVICE

BACKGROUND OF THE INVENTION

A storage device may be communicatively coupled to a host and to non-volatile/persistent memory including, for example, a NAND flash memory device on which the storage device may store data received from the host. The memory device may include multiple dies which may be divided into physical blocks and the storage device may store data in blocks on the memory device. The host may address the data stored in the blocks on the memory device using logical block addresses that may be mapped to physical addresses on the memory device. As the memory device is used, not all blocks on the memory device may have the same quality. For example, some blocks may have higher bit error rates (BER) than other blocks or some word lines in a block may have higher BER than other word lines in the block. If the BER associated with a block or word lines within a block reaches a certain BER threshold, the data on the block may be uncorrectable. Due to the characteristics of the memory device, the memory device may need to be refreshed periodically to reliably retain the data stored on the memory device.

A controller on the storage device may also execute background operations to manage resources on the memory device. For example, the controller may monitor the memory device and may execute garbage collection and other relocation functions per internal relocation algorithms to refresh the data on the memory device. As part of the background operations, the controller may also execute read refresh operations to refresh the data on the memory device by moving the data from one location on the memory device to another on the memory device. The controller may use the refresh operations to ensure that the BER associated a block/word line does not reach the BER threshold.

When the storage device is connected to a host, the controller may draw power from the host to perform the background operations to, for example, refresh the data to retain the data integrity. If the storage device is not connected to the host for an extended period of time, the storage device may not have access to power to perform background refresh operations on blocks with high BER. Consider an example where the storage device is a portable storage device that is disconnected from the host for an extended period of time (for example, six months). If the storage device is reconnected to the host briefly (for example, for a few seconds) to copy a file and is disconnected from the host after the file copy for another extended time period, the controller may not have sufficient time while the storage device is connected to the host to refresh the data on the blocks with high BER to reliably retain the data on those blocks.

The storage device may typically have a data retention guarantee. For example, the integrity of the data stored in the memory device may be guaranteed for a given time period (for example, two years) if the storage device that is disconnected from the host is stored at a given temperature (for example, at forty-five-degrees Celsius). If, for example, the storage device is stored at a fifty-degree Celsius temperature, the data retention guarantee may decrease to, for example, one and a half years. If the controller cannot refresh the data within the data retention guarantee time period, the BER associated with blocks on the memory device may increase. Once the BER reaches the BER threshold the data on the memory device may uncorrectable. As such, to maintain the data reliability on shelved storage devices (i.e., storage device that may be disconnected from the host and other power sources), the storage device may have to be periodically connected to the host for the controller to refresh data (i.e., move blocks with high BER from one location to another location on the memory device) to maintain the data retention guarantee.

SUMMARY OF THE INVENTION

In some implementations, a storage device may maintain data integrity for data stored on a memory device when the storage device is disconnected from a host for a given period of time. The storage device may include a memory device including blocks to store data and a connection to an external power source that provides power to the storage device when the storage device is disconnected from the host. The storage device may also include a controller to monitor the health of the blocks on the memory device. The controller may determine a power capability of the external power source and the background operations that may be performed based on the power capability of the external power source and the health of the blocks on the memory device. The controller may refresh the data on the memory device based on the power capability of the external power source.

In some implementations, a method is provided on the storage device for maintaining data integrity for data stored on a memory device when the storage device is disconnected from a host for a given period of time. The method includes connecting the storage device to an external power source that provides power to the storage device when the storage device is disconnected from the host. The method also includes monitoring the health of the blocks on the memory device and determining a power capability of the external power source. The method further includes determining background operations that may be performed based on the power capability of the external power source and the health of the blocks on the memory device. The method also includes refreshing the data on the memory device based on the power capability of the external power source.

In some implementations, the storage device may maintain data integrity for data stored on a memory device when the storage device is disconnected from a host for a given period of time. The storage device includes a flash translation layer (FTL) to determine a power capability of the external power source. The FTL may execute a hard bit error rate analysis or a soft bit error rate analysis to monitor the health of the memory device based on the power capability of the external power source. A controller in the storage device may determine background operations that may be performed based on the power capability of the external power source and the health of the blocks on the memory device. The controller may refresh the data on the memory device based on the power capability of the external power source.

Figure 1:
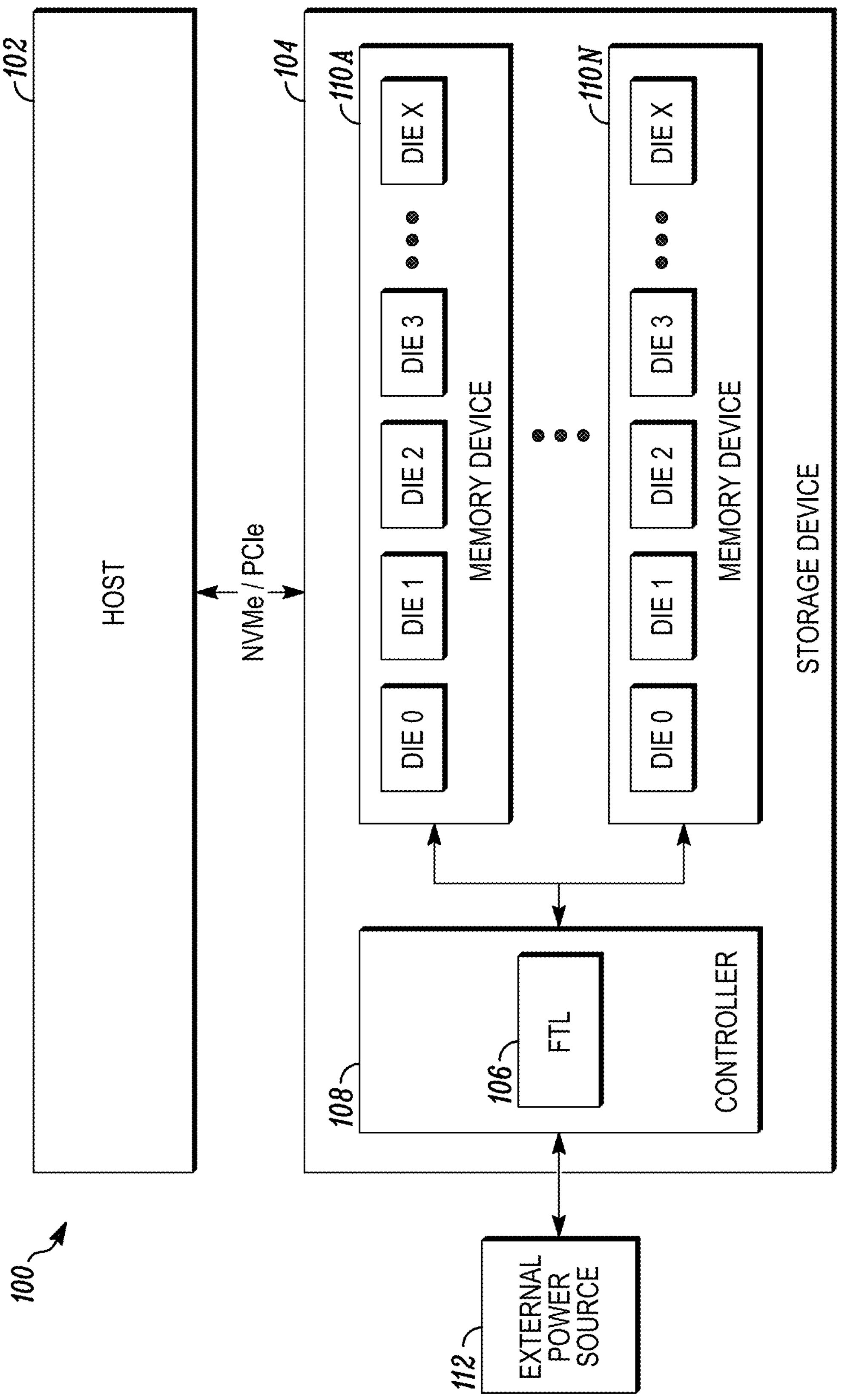
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Storage device 104 may communicate with host 102 via a Non-Volatile Memory Express (NVMe) protocol over a peripheral component interconnect express (PCIe) bus, and the like. Host 102 may include additional components (not shown in this figure for the sake of simplicity).

Storage device 104 may include a flash translation layer (FTL) 106, a controller 108, and one or more non-volatile memory devices 110*a*-110*n* (referred to herein as the memory device(s) 110). Storage device 104 may be connected to an external power source 112. Storage device 104 may be, for example, a solid-state drive (SSD). FTL 106 may monitor the health of blocks on memory device 110, determine the power capability of external power source 112, and determine background operations that may be performed based on the power capability of external power source 112 and the health of blocks on memory device 110.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may execute garbage collection, read refresh, and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include multiple dies (for example, DIE 0-DIE X), where the dies may be divided into blocks and data may be stored on the blocks in the dies. Memory device 110 may be included in storage device 104 or may be otherwise communicatively coupled to storage device 104.

External power source 112 may be, for example, a solar panel circuit. It should be noted that external power source 112 may be another power source, and that a solar panel circuit is described herein as an example. External power source 112 may be connected to storage device 104 and controller 108 may use power provided by external power source 112 to refresh data on memory device 110 when storage device 104 is disconnected from host 102 for a given time period. In refreshing data on memory device 110, controller 108 may execute read refresh to move the data from one location on memory device 110 to another location on memory device 110 to reliably maintain the data on a shelved storage device 104 (i.e., a storage device that is disconnected from host 102 for an extended time period). External power source 112 may include a battery (not shown) to store power generated on power source 112.

Storage device 104 may set a frequency threshold and may include a timer that may run on battery power provided by power source 112. When the timer has run for a time period that is equal to the frequency threshold, FTL 106 may be started to monitor the health of memory device 110. FTL 106 may monitor the health of blocks on memory device 110 based on the power capabilities of the battery within power source 112. For example, FTL 106 may perform a detailed/hard bit error rate (BER) analysis of the blocks on memory device 110 when FTL 106 determines that battery power is at a first level (for example, at a level above a first threshold that may be associated with a high-power capacity of the battery). As part of the hard BER analysis, FTL 106 may estimate the BER associated with all or most of the flash fragments in most or all of the word lines in a flash block on memory device 110.

In another example, FTL 106 may perform a soft BER analysis when FTL 106 determines that battery power is at a second level (for example, a level below a second threshold that may be associated with a lower power capacity of the battery). As part of the soft BER analysis, FTL 106 may estimate the BER of selected word lines, flash fragments in those word lines, and/or blocks (i.e., estimate the BER on fewer word lines, flash fragments in those word lines, and/or blocks than the estimate performed in the hard BER analysis). In executing the soft BER analysis, FTL 106 may potentially skip some word lines in a block when it determines that the battery capacity is at the second level. In one example, FTL 106 may choose a standard set of word lines in a block including, for example, word lines at edges or some word lines which are more prone to errors and may perform the soft BER analysis on those word lines when the battery capacity is at the second level. As such, when the battery power is limited FTL 106 may optimize its BER analysis to correspond with the power capabilities of power source 112. Based on the BER analysis, FTL 106 may determine the BER associated with blocks/word lines on memory device 110.

FTL 106 may perform the soft BER analysis on a predefined number of word lines or blocks when power source 112 is at a first power capacity. The first power capacity may be when the power capacity of power source 112 is at a peak level (for example, above a percentage (for example, ninety percent) of the full power that may be provided by power source 112). In an example, when FTL 106 determines that power source 112 is at is at the first power capacity (for example when power source 112 is new), FTL 106 may perform the soft BER analysis on six-word lines in a block. As the power generated by power source 112 diminishes and the power capacity of power source 112 is at a second power capacity (for example, a power capacity that has diminished from the peak level by a given percentage (for example, twenty-five percent)), FTL 106 may course correct and decrease the predefined number of word lines in a block and/or the predefined number of blocks associated with the soft BER analysis. For example, if capacity of power source 112 diminishes with age and when the power generated by power source 112 is at the second power capacity, FTL 106 may perform soft BER analysis on three-word lines in a block. This may allow storage device 104 to use some of the power provided by power source 112 for BER analysis while retaining some of the power provided by power source 112 for refresh and other background operations.

FTL 106 may determine a set of die(s) to be refreshed on priority, considering the available power provided by power source 112. FTL 106 may further determine the number of parallel dies that can function together considering the available power provided by power source 112. Storage device 104 may use that number of dies to refresh/relocate blocks of memory device 110. Consider an example where storage device 104 may use eight dies in parallel when connected to host 102. When storage device 104 is not connected to host 102, storage device 104 may determine the available power provided by power source 112. Based on the available battery power, storage device 104 may not be able to draw sufficient power from power source 112 to operate the eight dies in parallel. Therefore, FTL 106 may determine the number of parallel dies that can function together based on the available power provided by power source 112 and storage device 104 may use that number of dies to refresh/relocate portions of memory device 110.

The refresh requirements of storage device 104 may increase overtime. For example, the periods for executing a refresh operation may be longer when storage device 104 is new than it would be after storage device 104 has been in use for a period of time. After a certain period of use, the program/erase count or wear and tear of memory device 110 may increase. Power source 112 may also deteriorate over time and as such the power capacity of power source 112 may reduce over time. Controller 108 may set an off-time refresh threshold such that when storage device 104 is disconnected from host 102 for a period that is greater than or equal to the off-time refresh threshold, controller 108 may refresh the data on memory device 110 to maintain data integrity. Controller 108 may thus use the off-time refresh threshold to set the time periods between refresh operations. Controller 108 may adjust the off-time refresh threshold based on the condition of memory device 110 (for example, the program/erase count or wear and tear of memory device 110) and/or the condition of power source 112 (for example, the battery output). In an example, as power source 112 ages and its battery output diminish, controller 108 may increase the off-time refresh threshold.

Controller 108 may also vary the refresh workload based on the off-time refresh threshold. For example, as controller 108 increases the off-time refresh threshold because of, for example, deterioration of power source 112, controller 108 may also decrease the workload to optimize use of the available power. For example, as controller 108 increases the off-time refresh threshold, controller 108 may execute a soft BER analysis wherein FTL 106 may perform a minimum BER estimate on word lines/blocks in memory device 110.

As part of a periodic refresh operation, controller 108 may identify the BER of affected blocks (i.e., blocks that may need to be refreshed to maintain the data integrity). Controller 108 may determine the set of refresh requirements in a current refresh cycle (for example, the number of blocks/word lines with a high BER that need to be refreshed in the current refresh cycle to retain the data). Controller 108 may execute read refresh on the affected blocks using power provided by power source 112.

Controller 108 may also evaluate the power provided by power source 112 and determine the amount of idle time garbage collection it can perform with the available power provided by power source 112. Controller 108 may also determine the start time and end time of the idle time garbage collection at a logical end point. Based on the available power provided by power source 112, controller 108 may execute an associated amount of idle time garbage collection so that when storage device 104 is subsequently powered of and initialized, data on memory device 110 may be refreshed.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
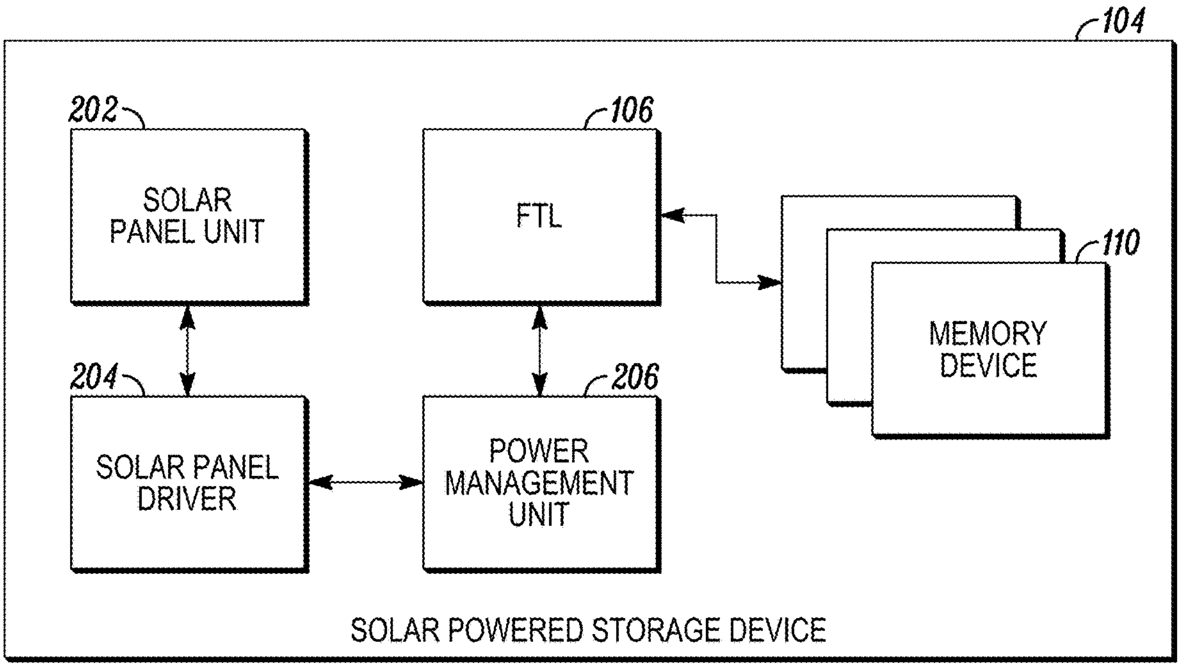
FIG. 2 is an example block diagram of a solar powered storage device to refresh blocks on a memory device in accordance with some implementations.

FIG. 2 is an example block diagram of a solar powered storage device to refresh blocks on a memory device in accordance with some implementations. Storage device 104 may include a solar panel unit/circuit 202, a solar panel driver 204, a power management unit 206, and FTL 106. Solar panel unit 202 may be the external power source 112, Solar panel driver 204 may communicatively couple solar panel unit 202 to storage device 104 and provide the current health/condition of solar panel unit 202 to power management unit 206. Power management unit 206 may manage the power provided by solar panel unit 202 and provide information on the power provided by solar panel unit 202 to FTL 106.

When storage device 104 is disconnected from host 102 for a given time period, FTL 106 may determine that power is available to storage device 104 from solar panel unit 202. FTL 106 may determine the amount of available power based on input from power management unit 206. Depending on the amount of available power provided by solar panel unit 202, FTL 106 estimate the BER of blocks/word lines on memory device 110. For example, if the amount of available power is above a first threshold, FTL 106 may perform a hard BER estimate to identify the BER associated with all blocks on memory device 110. If the amount of available power is below the first threshold, FTL 106 may perform a minimum BER estimate or a soft BER estimate, wherein FTL 106 may estimate the BER on some blocks and/or word lines in some blocks and skip BER estimation on some blocks and/or word lines.

During a periodic refresh, controller 108 may refresh affected blocks (i.e., blocks with BER above a BER threshold) based on the amount of available power. Controller 108 may also execute idle time garbage collection based on the amount of available power. Controller 108 may optionally correct parameters used by FTL 106 in soft BER analysis when it determines defects in solar panel unit 202. Storage device 104 may thus perform a status check on the source of power and perform backend operations consistent with the amount of available power from the power source when storage device 104 is disconnected from host 102 for a given time period. As indicated above FIG. 2 is provided as an example. Other examples may differ from what is described in FIG. 2.

When storage device 104 is in an active state and is operating with, for example, sixteen dies in parallel while using a higher toggle mode configuration, storage device 104 may consume 2-3 watts (W) of power. Considering that storage device 104 may refresh the blocks in memory device 110 in idle time when storage device 104 is disconnected from host 102 for a given time period, storage device may refresh one die at a time with low frequency. Storage device 104 may thus consume approximate 250 mW of power when performing BER detection and correction to maintain data retention on memory device 110.

Figure 3:
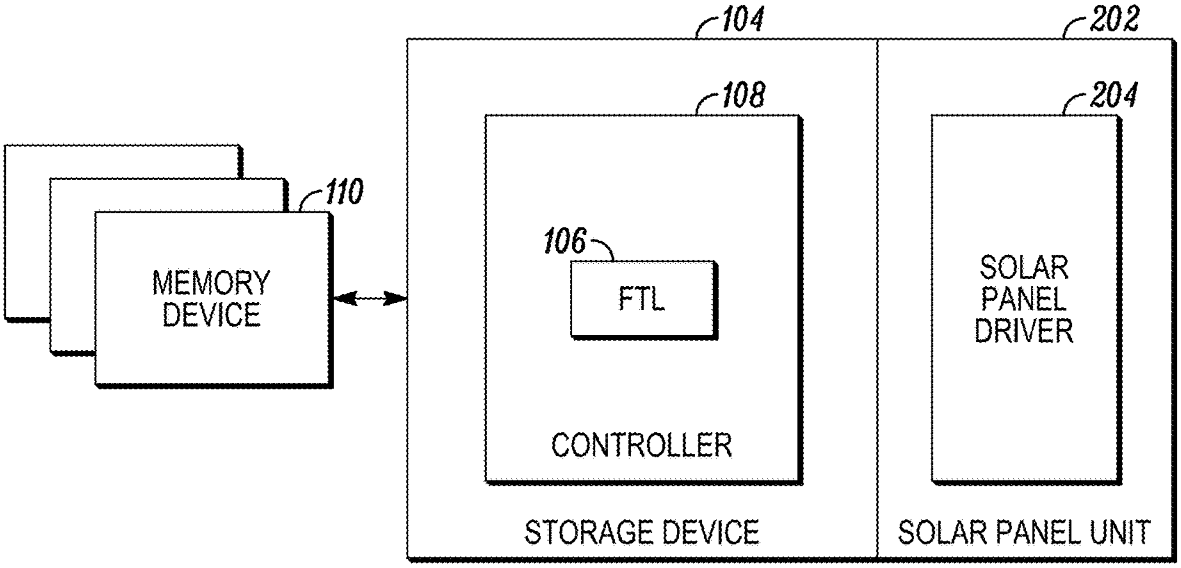
FIG. 3 is an example block diagram of a solar powered storage device configuration in accordance with some implementations.

FIG. 3 is an example block diagram of a configuration wherein the storage device is connected to an external power source in accordance with some implementations. Solar panel unit 202 may be connected to the side of storage device 104. Storage device 104 may have a form factor with more sideways surface area to create an area for connecting the solar panels in solar panel unit 202. The connection of solar panel unit 202 to storage device 104 may be safeguarded by a material in the boundary regions to ensure that the solar panels in solar panel unit 202 are safe and have maximum light visibility. The solar panels may be placed in storage device 104 such that the light may reach the surface area of the solar panels.

Solar panel unit 202 may include amorphous crystalline silicon solar cells that may have lower power requirements. The low powered cells may be charged by a bright source of light rather than direct sunlight. For example, the cells may be charged using flashlights and other sources of indirect light such as fluorescent bulbs, home light bulbs, and incandescent lamps. As such, power generated from the solar cell may be dependent on ambient heat, radiation, and/or sunlight.

The solar cell may back up a standard 500 mAh battery (2.5 W)) (not shown). Power and current from the solar cell may be transmitted to the battery to recharge the standard battery. In some implementations, the battery in solar panel circuit 202 may be charging continuously, irrespective of whether storage device 104 is connected to host 102 or disconnected from host 102. When storage device 104 is disconnected from host 102, controller 108 may be powered on when the battery is sufficiently charged, based on a periodic power module interrupt. When controller 108 is powered on, FTL 106 may perform the BER analysis and controller 108 may periodically perform the NAND blocks read refresh and optionally the idle time garbage collection. The amount of die parallelism and amount of read scrub may be derived from the amount of available power.

Figure 4:
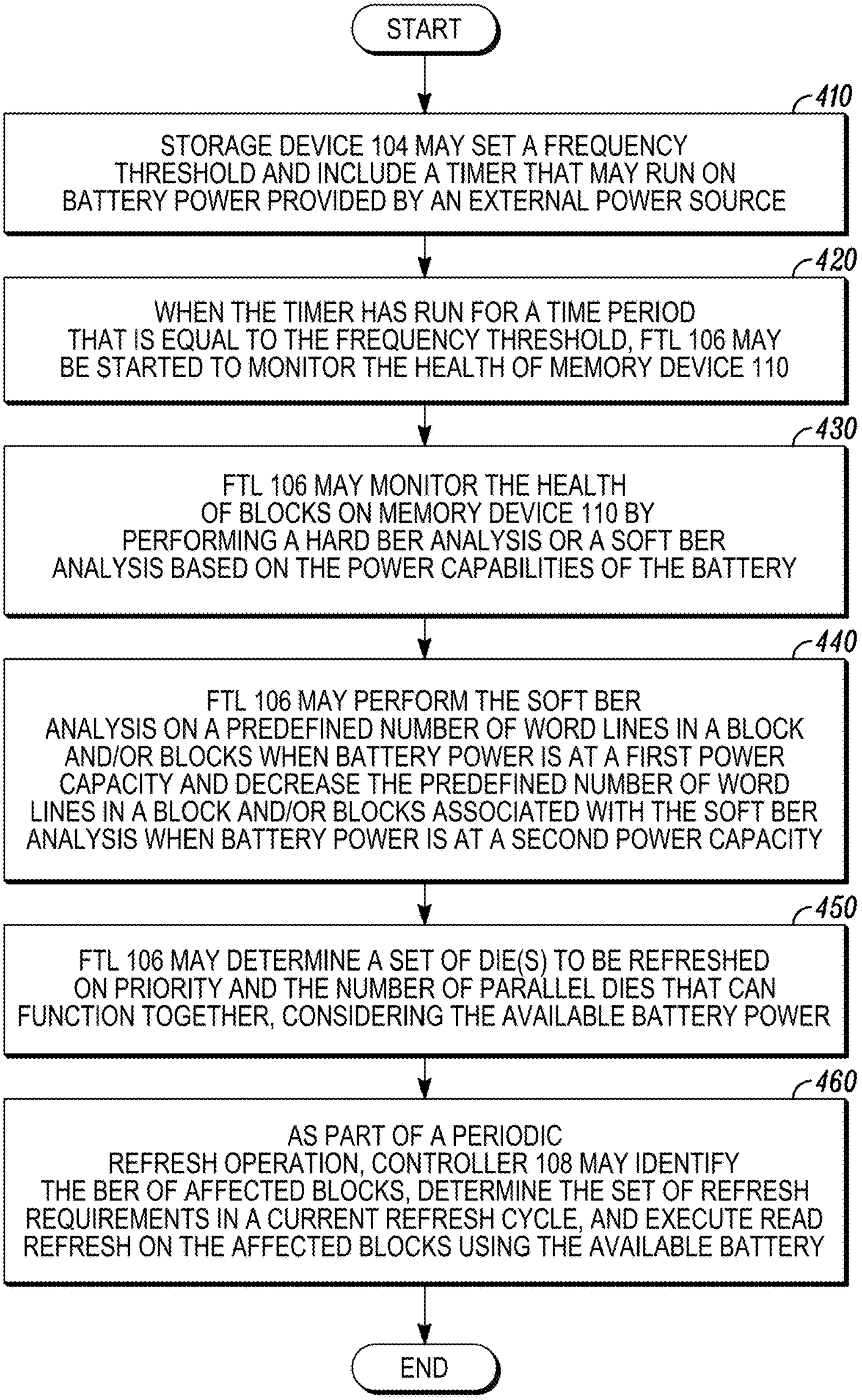
FIG. 4 is an example flow diagram for refreshing blocks on a memory device when a storage device is disconnected from a host for a given time period in accordance with some implementations.

FIG. 4 is an example flow diagram for refreshing blocks on a memory device when a storage device is disconnected from a host for a given time period in accordance with some implementations. At 410, storage device 104 may set a frequency threshold and include a timer that may run on battery power provided by an external power source. At 420, when the timer has run for a time period that is equal to the frequency threshold, FTL 106 may be started to monitor the health of memory device 110. At 430, FTL 106 may monitor the health of blocks on memory device 110 by performing a hard BER analysis or a soft BER analysis based on the power capabilities of the battery. At 440, FTL 106 may perform the soft BER analysis on a predefined number of word lines in a block and/or blocks when battery power is at a first power capacity and decrease the predefined number of word lines in a block and/or blocks associated with the soft BER analysis when battery power is at a second power capacity. At 450, FTL 106 may determine a set of die(s) to be refreshed on priority and the number of parallel dies that can function together, considering the available battery power. At 460, as part of a periodic refresh operation, controller 108 may identify the BER of affected blocks, determine the set of refresh requirements in a current refresh cycle, and execute read refresh on the affected blocks using the available battery. As indicated above FIG. 4 is provided as an example. Other examples may differ from what is described in FIG. 4.

Figure 5:
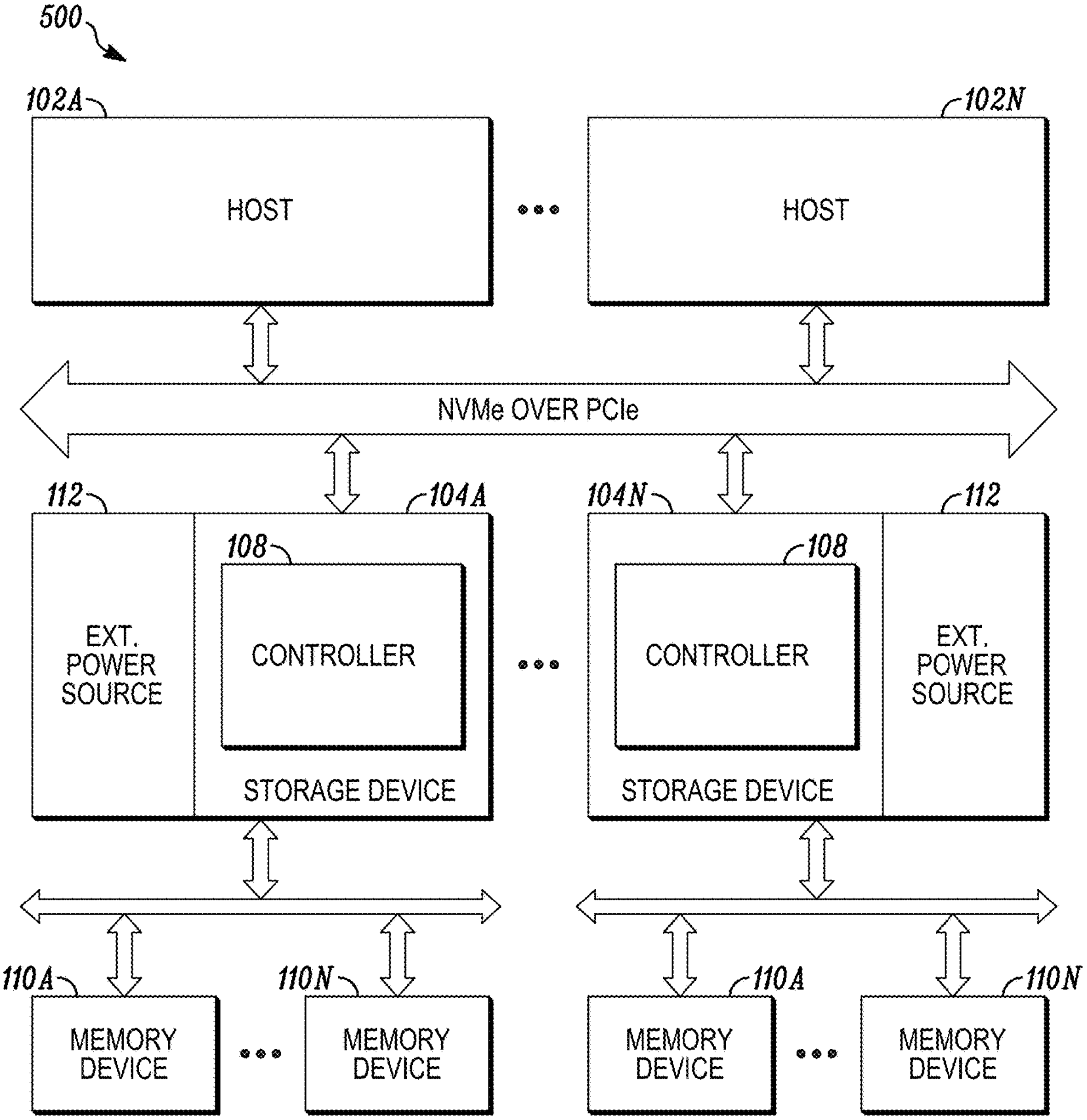
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and one or more storage devices 104*a*-104*n* (referred to herein as storage device(s) 104). Although storage devices 104 are shown as connected to host 102, storage devices 104 may be disconnected from host 102. When storage device 104 is disconnected from host for an extended time period, controller 108 may monitor the health of memory blocks and available power provided by an external power source 112 and may refresh blocks in memory device based on available power provided by external power source 112. Hosts 102 and storage devices 104 may communicate via Non-Volatile Memory Express (NVMe) over peripheral component interconnect express (PCI Express or PCIe), SD, or the like.

Devices of Environment 500 may interconnect via wired connections, wireless connections, or a combination of wired and wireless connections. For example, the network in FIG. 5 may include NVMe over Fabric(NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to maintain data integrity for data stored on a memory device when the storage device is disconnected from a host for a given period of time, the storage device comprises:

a memory device including blocks to store data;

a connection to an external power source that provides power to the storage device when the storage device is disconnected from the host; and a controller to monitor a health of the blocks on the memory device, determine a power capability of the external power source, determine background operations to be performed based on the power capability of the external power source and the health of the blocks on the memory device, and refresh the data on the memory device based on the power capability of the external power source.

2. The storage device of claim 1, wherein the controller executes a read refresh to move the data from one location on the memory device to another location on the memory device to reliably maintain the data on the storage device when the storage device is disconnected from the host for the given period of time.

3. The storage device of claim 1, wherein the storage device sets a frequency threshold and includes a timer that run on power provided by the external power source, wherein when the timer has run for a time period that is equal to the frequency threshold, the controller starts a flash translation layer (FTL) to monitor the health of the memory device.

4. The storage device of claim 3, wherein the FTL monitors the health of the blocks on the memory device based on the power capability of the external power source.

5. The storage device of claim 3, wherein the FTL performs a hard bit error rate analysis of the blocks on the memory device when the FTL determines that the power capability of the external power source is at a first level.

6. The storage device of claim 3, wherein the FTL performs a soft bit error rate analysis of the blocks on the memory device when the FTL determines that the power capability of the external power source is at a second level, wherein as part of the soft bit error rate analysis, the FTL estimates a bit error rate of at least one of selected blocks and word lines in a block.

7. The storage device of claim 3, wherein the FTL performs a soft bit error rate analysis on a predefined number of the blocks on the memory device when the power capability of the external power source is at a first power capacity and reduces the predefined number when the power capability of the external power source is at a second power capacity.

8. The storage device of claim 3, wherein the FTL determines a set of dies to be refreshed on a priority based on the power capability of the external power source, determines a number of parallel dies to use in refreshing data based on the power capability of the external power source, and uses the number of parallel dies to refresh blocks on the memory device.

9. The storage device of claim 1, wherein the controller sets an off-time refresh threshold and uses the off-time refresh threshold to set time periods between refresh operations.

10. The storage device of claim 9, wherein the controller adjusts the off-time refresh threshold based at least on one of a condition of the memory device and a condition of the external power source.

11. The storage device of claim 9, wherein the controller varies a refresh workload based on the off-time refresh threshold.

12. The storage device of claim 1, wherein as part of the refresh, the controller identifies a bit error rate of affected blocks in the memory device and executes read refresh on the affected blocks.

13. The storage device of claim 1, wherein the controller evaluates the power capability of the external power source, determines an amount of idle time garbage collection to be performed based on the power capability of the external power source, and executes the amount of idle time garbage collection.

14. A method in a storage device for maintaining data integrity for data stored on a memory device when the storage device is disconnected from a host for a given period of time, the storage device comprises a controller to execute the method comprising:

connecting the storage device to an external power source that provides power to the storage device when the storage device is disconnected from the host;

monitoring a health of blocks on the memory device;

determining a power capability of the external power source;

determining background operations to be performed based on the power capability of the external power source and the health of the blocks on the memory device; and refreshing the data on the memory device based on the power capability of the external power source.

15. The method of claim 14, wherein the refreshing comprises identifying a bit error rate of affected blocks in the memory device and executing a read refresh to move the data from one location on the memory device to another location on the memory device to reliably maintain the data on the storage device when the storage device is disconnected from the host for the given period of time.

16. The method of claim 14, further comprising setting a frequency threshold and running a timer on power provided by the external power source, wherein when the timer has run for a time period that is equal to the frequency threshold, the method includes starting a flash translation layer (FTL) to monitor the health of the memory device.

17. The method of claim 16, further comprising:

monitoring the health of the blocks on the memory device based on the power capability of the external power source;

performing a hard bit error rate analysis of the blocks on the memory device when the FTL determines that the power capability of the external power source is at a first level; and performing a soft bit error rate analysis of the blocks on the memory device when the FTL determines that the power capability of the external power source is at a second level, wherein as part of the soft bit error rate analysis, the FTL estimates a bit error rate of at least one of selected blocks and word lines in a block.

18. The method of claim 16, further comprising performing a soft bit error rate analysis on a predefined number of the blocks on the memory device when the power capability of the external power source is at a first power capacity and reducing the predefined number when the power capability of the external power source is at a second power capacity.

19. The method of claim 14, further comprising evaluating the power capability of the external power source, determining an amount of idle time garbage collection to be performed based on the power capability of the external power source, and executing the amount of idle time garbage collection.

20. A storage device to maintain data integrity for data stored on a memory device when the storage device is disconnected from a host for a given period of time, the storage device comprises:

a memory device including blocks to store data;

a connection to an external power source that provides power to the storage device when the storage device is disconnected from the host;

a flash translation layer (FTL) to determine a power capability of the external power source, execute one of a hard bit error rate analysis and a soft bit error rate analysis to monitor a health of the memory device based on the power capability of the external power source; and a controller to determine background operations to be performed based on the power capability of the external power source and the health of the blocks on the memory device and refresh the data on the memory device based on the power capability of the external power source.

* * * * *